(12) United States Patent
Sun et al.

(10) Patent No.: US 10,929,090 B2
(45) Date of Patent: Feb. 23, 2021

(54) WIRELESS DISPLAY SCREEN

(71) Applicant: Shenzhen Ainoldia Intelligent Control Technology Co., LTD, Guangdong (CN)

(72) Inventors: Guoxing Sun, Jiangsu (CN); Ronghua Wen, Guangdong (CN)

(73) Assignee: Shenzhen Ainoldia Intelligent Control Technology Co., LTD, Shenzhen (CN)

(*) Notice: Subject to any disclaimer, the term of this patent is extended or adjusted under 35 U.S.C. 154(b) by 0 days.

(21) Appl. No.: 16/416,310

(22) Filed: May 20, 2019

(65) Prior Publication Data
US 2020/0210130 A1 Jul. 2, 2020

(30) Foreign Application Priority Data

Dec. 27, 2018 (CN) .......................... 201811611212.8

(51) Int. Cl.
| | |
|---|---|
| *G09G 5/00* | (2006.01) |
| *G06F 3/147* | (2006.01) |
| *G06F 1/16* | (2006.01) |
| *G06F 1/3203* | (2019.01) |
| *G06F 3/044* | (2006.01) |
| *G09G 3/36* | (2006.01) |

(52) U.S. Cl.
CPC ............ *G06F 3/147* (2013.01); *G06F 1/1601* (2013.01); *G06F 1/3203* (2013.01); *G06F 3/044* (2013.01); *G09G 3/36* (2013.01); *G09G 2330/021* (2013.01); *G09G 2370/16* (2013.01)

(58) Field of Classification Search
CPC ...... G06F 3/147; G06F 1/1601; G06F 1/3203; G06F 3/044; G06F 13/20; G09G 3/36; G09G 2330/021; G09G 2370/16
USPC ............................................ 345/1.1, 1.2, 52
See application file for complete search history.

(56) References Cited

U.S. PATENT DOCUMENTS

| | | | |
|---|---|---|---|
| 9,581,972 B1* | 2/2017 | Arrow ................. | H01M 2/1055 |
| 2018/0234494 A1* | 8/2018 | Klemets ................ | H04W 76/14 |
| 2018/0288208 A1* | 10/2018 | Lee .................... | H04M 1/72527 |
| 2019/0370008 A1* | 12/2019 | Shibayama ........... | G06F 9/4411 |
| 2020/0272404 A1* | 8/2020 | Mu ..................... | G06F 3/04883 |

* cited by examiner

*Primary Examiner* — Jennifer T Nguyen

(57) ABSTRACT

A wireless display screen includes a display screen body, a power management module, a wireless audio/video signal receiving module used for receiving a wireless audio/video signal emitted by a host device and an audio/video signal conversion process module used for converting a video signal into a display signal which adapts to the display screen body to perform image display. A user selects a host device capable of emitting the wireless audio/video signal to perform signal pairing on the wireless display screen so as to be capable of achieving synchronous display and play of a signal outputted by the host device.

9 Claims, 11 Drawing Sheets

WIRELESS DISPLAY SCREEN

CROSS REFERENCE TO RELATED APPLICATIONS

The present application claims the benefit of Chinese Patent Application No. 201811611212.8 filed on Dec. 27, 2018, the contents of which are incorporated herein by reference in their entirety.

TECHNICAL FIELD

The present disclosure relates to the technical field of electronic products, and in particular, to a wireless display screen.

BACKGROUND

As individual requirements of people on the display device are gradually increased, the traditional host products, such as the computer host (namely the PC), the mobile terminal (such as the smartphone and the tablet computer) and the like, are no longer limited to only be configured with specialized display devices. Most of the host products generally select configurations of themselves interfaces in order that the host products can match with various display devices in use, so the individual requirements of different users can be met.

The existing display device can be connected to the host product mostly only through a data cable, such as the HDMI connecting line, the VGA connecting line, the DVI connecting line and the like, or the on-screen display data line and the like so as to achieve a single image display function. As the Internet of things technology is quickly developed, the fields, such as function expansion of the mobile phone, vehicle display, intelligent home, intelligent industrial control devices, game peripheral devices and the like, also provide a wider space and scene for expansion application of the display device. However, the existing display device is influenced by factors, such as its single use function, single use manner and the like, so that it cannot meet the actual requirements of the expansion application.

SUMMARY

In view of the above defects of the prior art, an objective of the present disclosure is to provide a wireless display screen.

To achieve the above objective, the present disclosure adopts the following technical schemes.

A wireless display screen comprises a display screen body, a wireless audio/video signal receiving module used for receiving a wireless audio/video signal emitted by a host device and performing a decoding process on the wireless audio/video signal, an audio/video signal conversion process module used for converting a video signal outputted by the wireless audio/video signal receiving module into a display signal which adapts to the display screen body to perform image display, and a power management module used for providing working voltage for the display screen body, the wireless audio/video signal receiving module and the audio/video signal conversion process module; the wireless audio/video signal receiving module is connected to the display screen body through the audio/video signal conversion process module, and the power management module is simultaneously connected to the display screen body, the wireless audio/video signal receiving module and the audio/video signal conversion process module.

Preferably, the wireless display screen further comprises a Type-C interface simultaneously connected with the audio/video signal conversion process module and the power management module in order to receive an audio/video stream signal outputted by the host device through a data cable and transmit the audio/video stream signal to the audio/video signal conversion process module in a DP (display port) signal transmission format, and a Type-C protocol process module connected between the power management module and the Type-C interface in order that the Type-C interface performs electric energy transmission on the host device by performing PD (Power Delivery) protocol communication on the power management module.

Preferably, the wireless display screen further comprises a loudspeaker connected with the audio/video signal conversion process module in order to receive an audio signal outputted by the audio/video signal conversion process module.

Preferably, the display screen body comprises a liquid crystal display screen used for receiving the video signal outputted by the audio/video signal conversion process module, a touch capacitive screen integrated with the liquid crystal display screen into a whole body in order to adjust and control a display content of the liquid crystal display screen by receiving an external touch instruction signal and a touch driving chip connected with the touch capacitive screen in order to drive the touch capacitive screen to perform a touch instruction; and the power management module is simultaneously electrically connected to the liquid crystal display screen, the touch capacitive screen and the touch driving chip.

Preferably, the wireless display screen further comprises a Bluetooth communication module used for receiving a wireless control signal sent by the host device in order to adjust and control the display content of the liquid crystal display screen through the touch capacitive screen and simultaneously feed back a response signal of the touch capacitive screen to the host device, and the Bluetooth communication module is connected between the power management module and the touch driving chip.

Preferably, the wireless display screen further comprises an APP software mapping module used for uploading a coordinate signal of the touch capacitive screen to the host device through the Bluetooth communication module, and the APP software mapping module is connected between the Bluetooth communication module and the touch capacitive screen.

Preferably, the audio/video signal conversion process module is further connected with a physical key set for adjusting and controlling display parameters of the display screen body through the audio/video signal conversion process module.

Preferably, the wireless display screen further comprises at least one DC/DC signal interface for receiving the audio/video stream signal outputted by the host device through the data cable and transmitting the audio/video stream signal to the audio/video signal conversion process module in an HDMI signal transmission format.

Preferably, the power management module comprises a lithium battery energy storage module, a lithium battery management module used for performing overcharge and overdischarge management on the lithium battery energy storage module, a Type-C female socket used for being physically connected with the host device, a charge/discharge management module used for charging electric energy outputted through the Type-C female socket to the lithium battery energy battery module through the lithium battery management module or externally discharging electric energy released by the lithium battery energy storage module through the lithium battery management module via the Type-C female socket, and a power switch control module used for receiving the electric energy outputted by the lithium battery management module and at least providing the electric energy for the display screen body, the wireless audio/video signal receiving module and the audio/video signal conversion process module; and the Type-C female socket, the charge/discharge management module, the lithium battery management module and the power switch control module are sequentially connected, and the lithium battery energy storage module is connected to the lithium battery management module.

Preferably, the power management module further comprises an upstream charge protocol management module used for externally outputting the electric energy outputted through the lithium battery management module by performing PD protocol communication on a charge interface, and the upstream charge protocol management module is connected between the lithium battery management module and the power switch control module.

Because the present disclosure adopts the above technical scheme, in practical use, a user only needs to select a host device capable of emitting a wireless audio/video signal to perform signal matching and pairing on the wireless display screen so as to be capable of achieving synchronous display and play of a signal outputted by the host device without needing of establishing a physical connection relation by using the data cable, such as a video connecting line and the like, thereby greatly avoiding various problems caused by different types of the data cables or signal ports, for example, the display screen and the host device cannot match with each other in use, and providing a wide space to expand a combination of the display screen and the Internet of things technology. Furthermore, due to optimal configuration of the whole display screen system, the display screen has a function of charging the host device, such as the mobile phone, the tablet computer and the like, and a function of being capable of establishing a physical connection with the traditional host device which can only utilize the data cable and a signal interface in use. The wireless display screen of the present disclosure has simple and compact system structure, higher practical value and wide application space.

a—wireless audio/video signal receiving module, b—audio/video signal conversion process module, c—Type-C interface, d—Type-C protocol process module, e—loudspeaker, f—liquid crystal display screen, g—touch capacitive screen, h—touch driving chip, k—Bluetooth communication module, m—APP software mapping module, n—physical key set, p—DC/DC signal interface, q—lithium battery energy storage module, r—lithium battery management module, s—Type-C female socket, t—charge/discharge management module, u—power switch control module, and v—upstream charge protocol management module.

DESCRIPTION OF THE EMBODIMENTS

The following describes embodiments of the present disclosure in detail with reference to the accompanying drawings. However, the present disclosure can be implemented by various manners as defined and covered by the claims.

Figure 1:
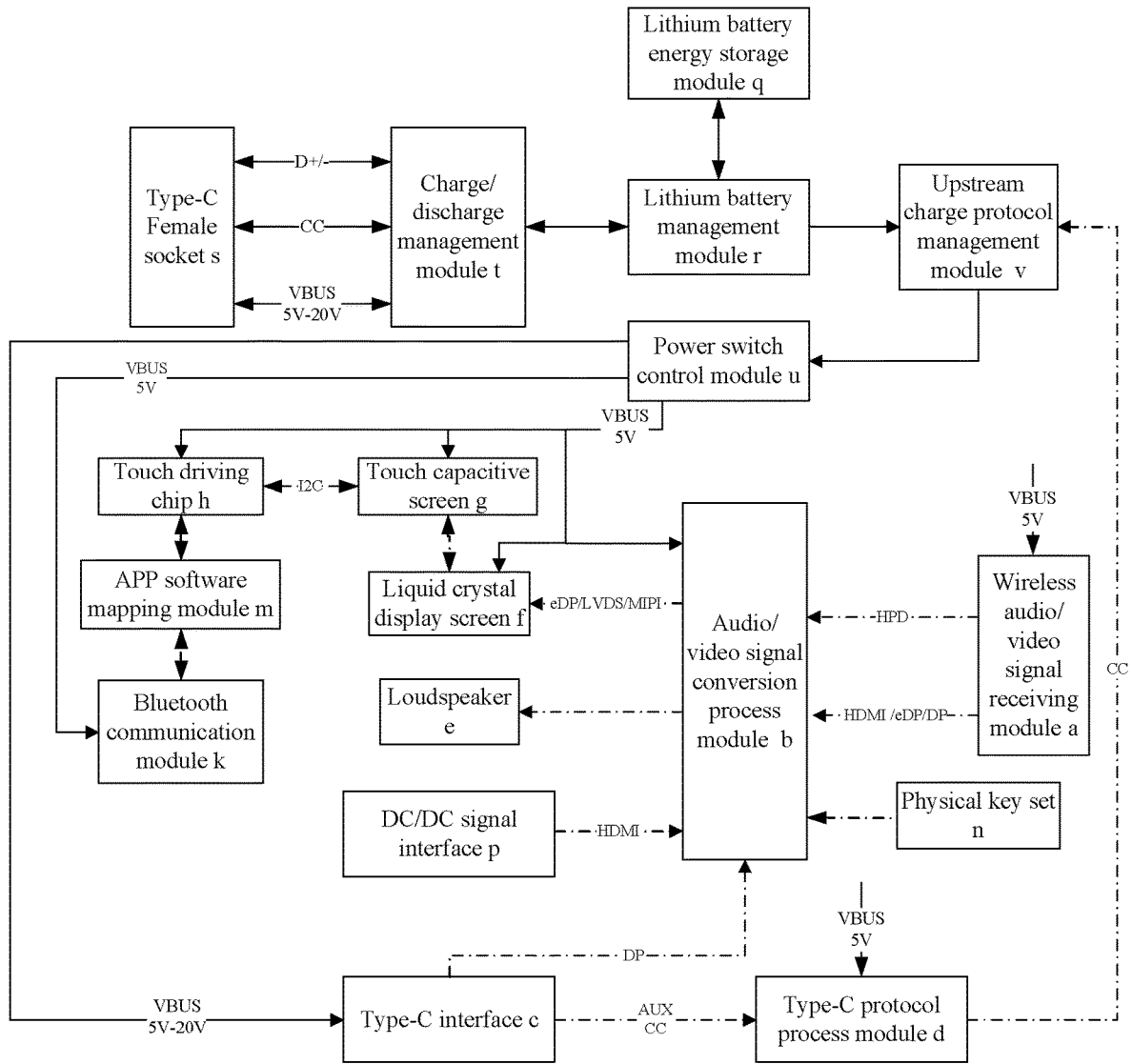
FIG. 1 is a topological structural diagram of a control principle of embodiments of the present disclosure.
Figure 2:
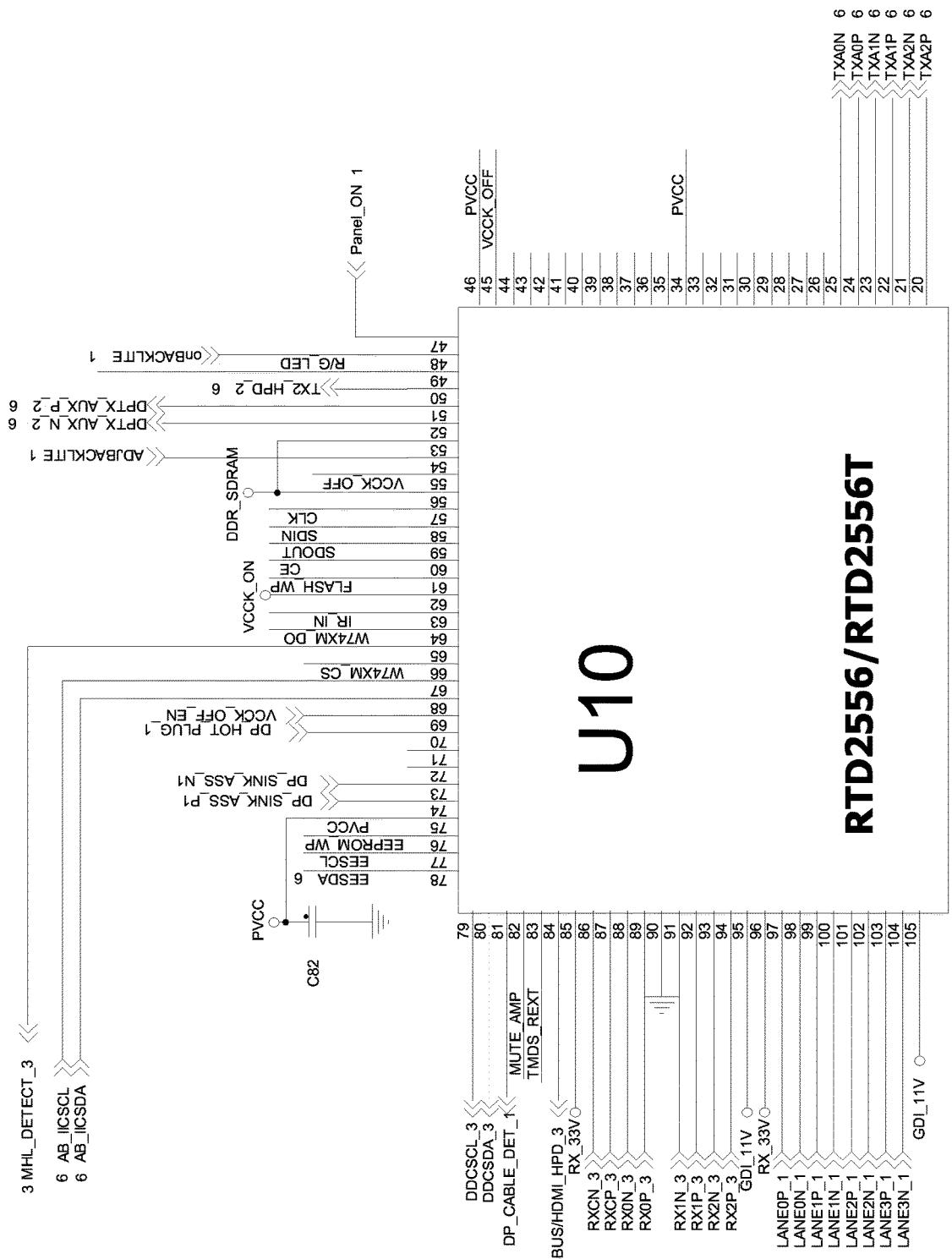
FIG. 2 is a first signal pin reference diagram of an audio/video signal conversion process module according to embodiments of the present disclosure.
Figure 3:
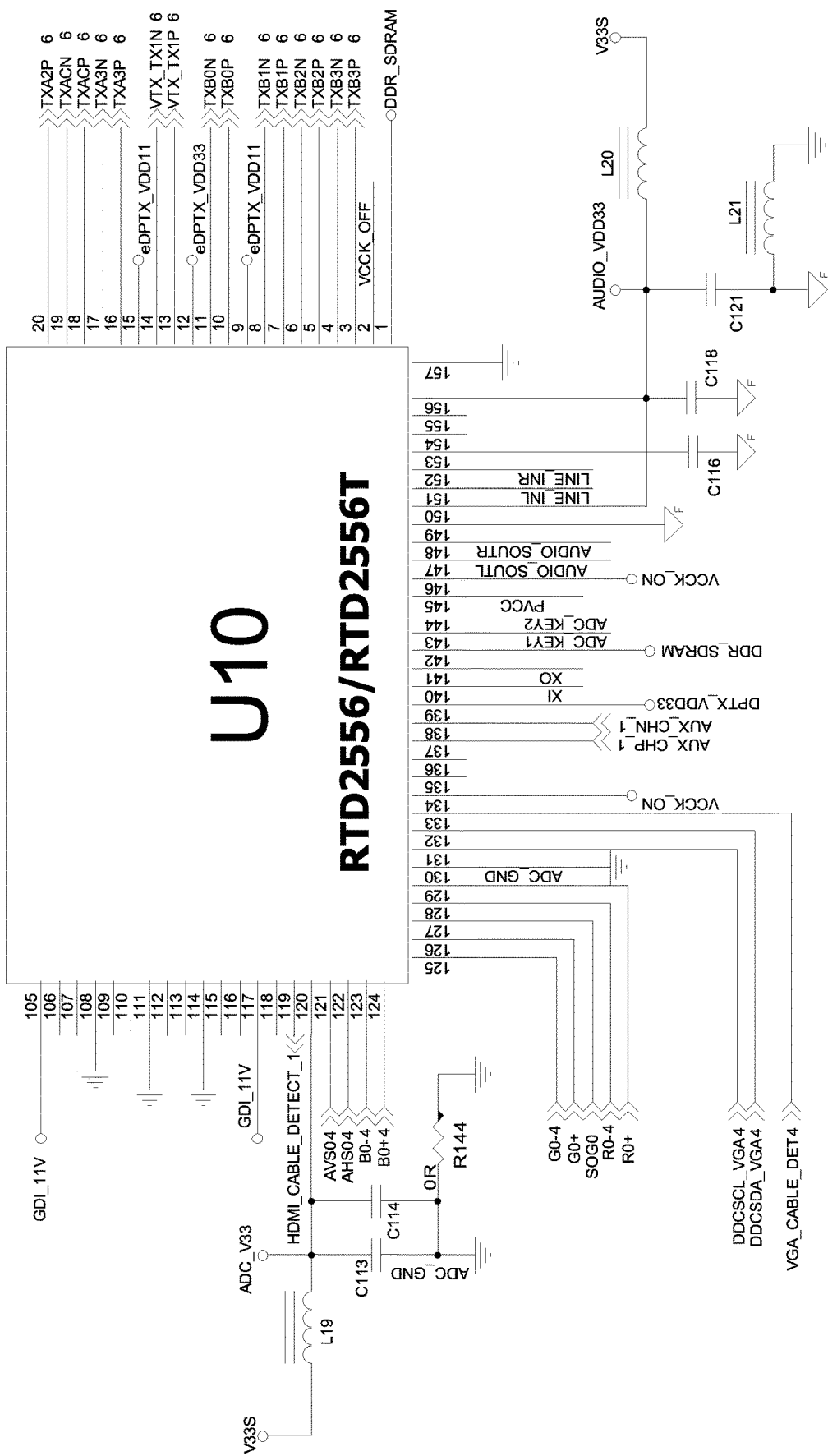
FIG. 3 is a second signal pin reference diagram of an audio/video signal conversion process module according to embodiments of the present disclosure.

As shown in FIG. 1, a wireless display screen provided by the embodiment comprises:

a display screen body, which mainly achieves a function of performing dynamic or static image display according to a received video signal;

a wireless audio/video signal receiving module a, which is mainly used for receiving a wireless audio/video signal emitted by the host device and performing a decoding process on the wireless audio/video signal (for example, decoding the wireless audio/video signal to be in a signal output format of HDMI, eDP, DP, HPD and the like), wherein the host device mainly is a device which adopts wireless technologies of 2.4G, 5.8G and the like and can emit the wireless audio/video signal, such as a smartphone, a tablet computer, a PC, an industrial control host and the like, and the wireless audio/video signal receiving module a can take an SII-SK63102 type wireless video processing IC as the core chip according to the actual situation;

an audio/video signal conversion process module b, which is mainly used for converting a video signal outputted by the wireless audio/video signal receiving module a into a display signal which adapts to the display screen body to perform image display, wherein the audio/video signal conversion process module b can take RTD2556 series display ICs as the core chip according to the actual situation (its peripheral signal pin diagram can be specifically configured referring to FIG. 2 and FIG. 3); and a power management module, which is mainly used for providing working voltage for the display screen body, the wireless audio/video signal receiving module a and the audio/video signal conversion process module b, wherein the wireless audio/video signal receiving module a is connected to the display screen body through the audio/video signal conversion process module b, and the power management module is simultaneously connected to the display screen body, the wireless audio/video signal receiving module a and the audio/video signal conversion process module b.

Figure 4:
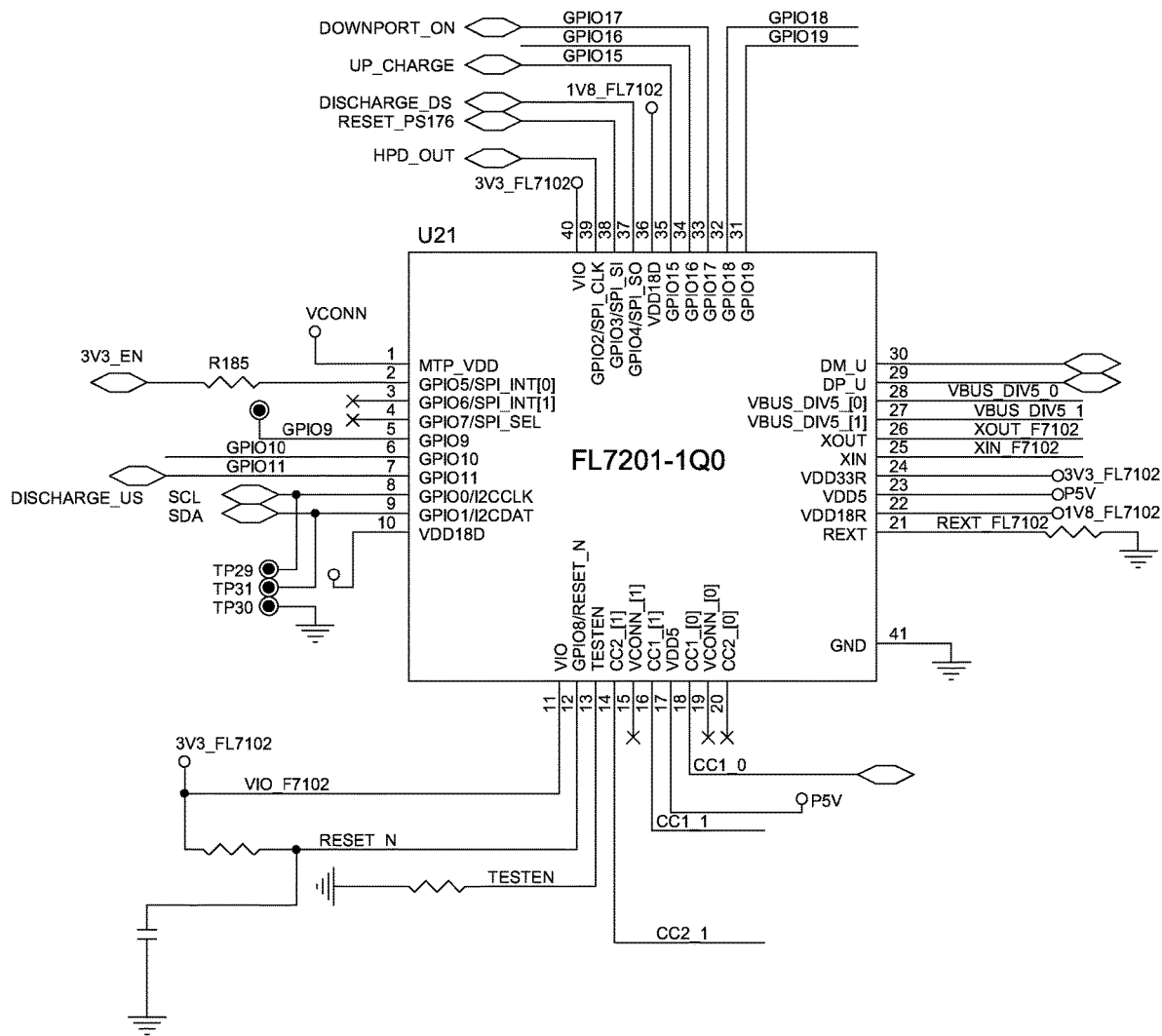
FIG. 4 is a signal pin reference diagram of a Type-C protocol process module according to embodiments of the present disclosure.

Therefore, the wireless display screen capable of receiving the wireless audio/video signal and performing image synchronous display according to the received video signal is formed by building a structure which takes the wireless audio/video signal receiving module a, the audio/video signal conversion process module b and the display screen body as the hardware system and limiting functions of the above element modules in the whole display screen. In practical use, a user only needs to select a host device capable of emitting the wireless audio/video signal to perform signal matching and pairing on the wireless display screen of the embodiment so as to be capable of achieving synchronous display and play of a signal outputted by the host device without needing of establishing a physical connection relation by using the data cable, such as a video connecting line and the like, thereby greatly avoiding various problems, for example, the display screen and the host device cannot match with each other in use, caused by different types of the data cables or signal ports, providing a wide space to expand a combination of the display screen and the Internet of things technology, and helping the wireless display screen to be capable of being applied to the fields of game peripheral devices, mobile phone function expansion, vehicle intelligent display, intelligent home, intelligent industrial control and the like. Thus, the wireless display screen is capable of performing image synchronous display according to the received video signal without being dependent on configuration of communicating interface of the host device and without a need for a match between a communicating interface of the wireless display screen and a communicating interface of the host device In order to enrich the practical functions of the whole display screen, especially helping the wireless display screen to be capable of being applied to the host device with a wireless video signal emitting function and simultaneously to be capable of adapting to the relatively more traditional host device (namely a device which can perform audio/video signal output only through the matching of the signal interface and the data cable) in use, the wireless display screen of the embodiment further comprises a Type-C interface c simultaneously connected with the audio/video signal conversion process module b and the power management module in order to receive an audio/video stream signal outputted by the host device through the data cable and transmit the audio/video stream signal to the audio/video signal conversion process module in a DP (Display port) signal transmission format, and a Type-C protocol process module d connected between the power management module and the Type-C interface c in order that the Type-C interface c performs electric energy transmission on the host device by performing PD (power delivery) protocol communication on the power management module. Therefore, by utilizing the Type-C interface c, the physical data transmission connection is established between the whole display screen and the relatively more traditional host device through the data cable in order to, by the audio/video signal conversion process module b, perform discrimination and conversion on the video signal inputted through the Type-C interface c and the wireless audio/video signal receiving module a and then to perform synchronous display through the display screen body; furthermore, by utilizing the PD protocol communication function between the Type-C protocol process module d and the power management module, the electric energy outputted by the power management module can be fully utilized to charge the peripheral host device, thereby greatly enriching the practical functions of the display screen. Wherein the Type-C protocol process module d of the embodiment can take an FL7102 type mobile power management IC as the core chip according to the actual situation (its peripheral signal pin diagram can be specifically configured referring to FIG. 4).

As a preferred scheme, in order to help the display screen to be capable of synchronously playing the sound in the image displaying procedure and improve an independent audio/video playing and displaying performance of the display screen, the wireless display screen of the embodiment further comprises a loudspeaker e connected with the audio/video signal conversion process module b in order to receive an audio signal outputted by the audio/video signal conversion process module b and externally play the audio signal. During specific implementation, the loudspeaker e and the display screen body can be assembled into a whole body based on the physical structure so as to form an integrated wireless display screen, and then achieve an effect of synchronously playing an audio and a video image.

In order to ensure that the user can directly operate and control the whole display screen in real time, the display screen body of the embodiment comprises a liquid crystal display screen f used for receiving the video signal outputted by the audio/video signal conversion process module b, a touch capacitive screen g integrated with the liquid crystal display screen f into a whole body in order to adjust and control a display content of the liquid crystal display screen f by receiving an external touch instruction signal and a touch driving chip h connected with the touch capacitive screen g (which can adopt a single-touch or multi-touch capacitive screen according to the actual situation) in order to drive the touch capacitive screen g to perform a touch instruction; wherein the power management module is simultaneously electrically connected to the liquid crystal display screen f, the touch capacitive screen g and the touch driving chip h in order that associated components can obtain the working power. Therefore, a touch display screen body can be formed by performing structure and signal relation combination on the touch capacitive screen g, the touch driving chip h and the liquid crystal display screen f, and the user can complete operations, for example, performing a wireless signal matching and pairing connection on the whole display screen and the host device, video image playing schedule and mode and the like, through touch operation and control of the display screen, thereby helping the user to achieve control on the display content by operating and controlling the display screen, and avoiding inconvenience brought by the fact that the display content can be operated and controlled only by utilizing the host device; wherein the touch driving chip h can take ILI2511 type driving IC as the core driving chip according to the actual situations.

Figure 5:
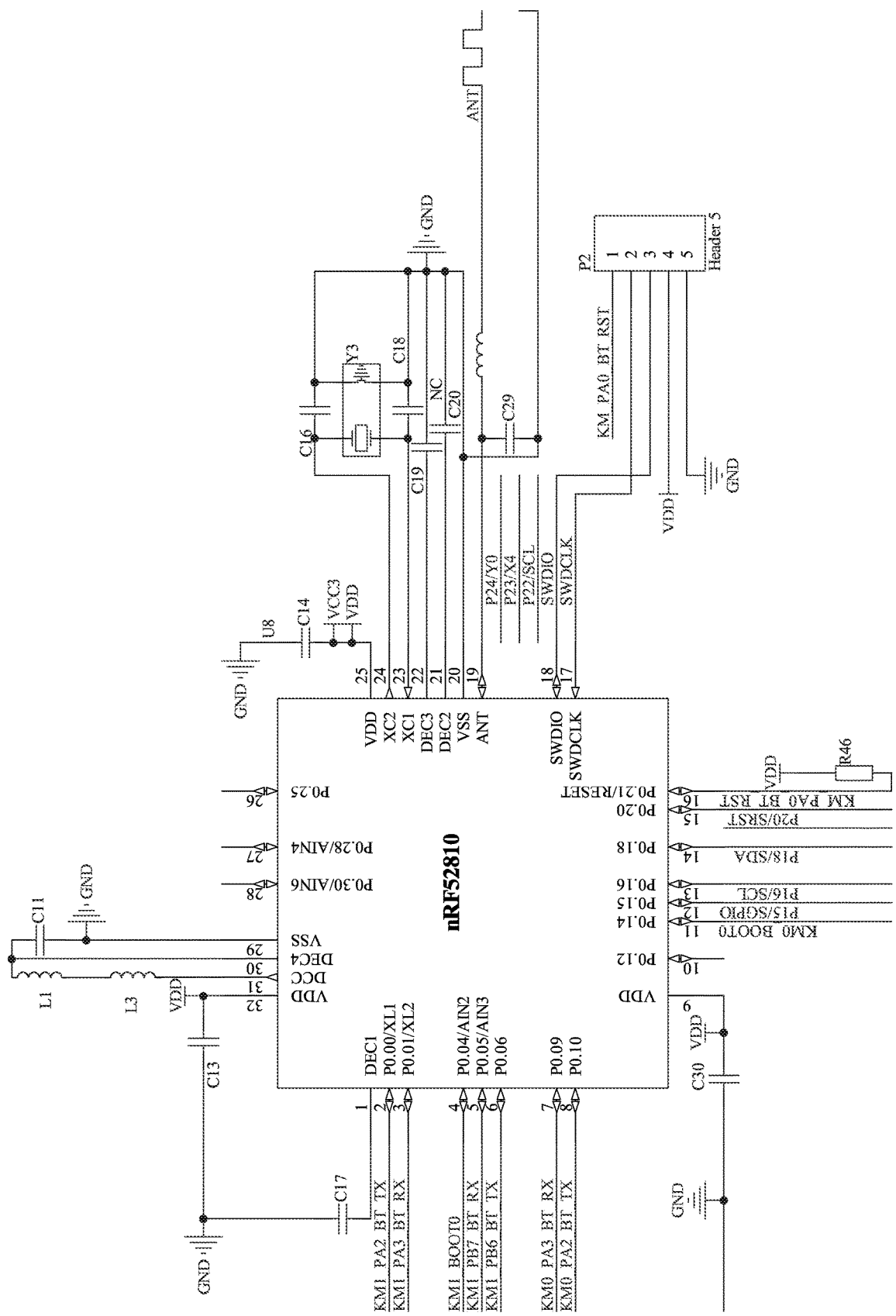
FIG. 5 is a circuit structure reference diagram of a Bluetooth communication module according to embodiments of the present disclosure.
Figure 6:
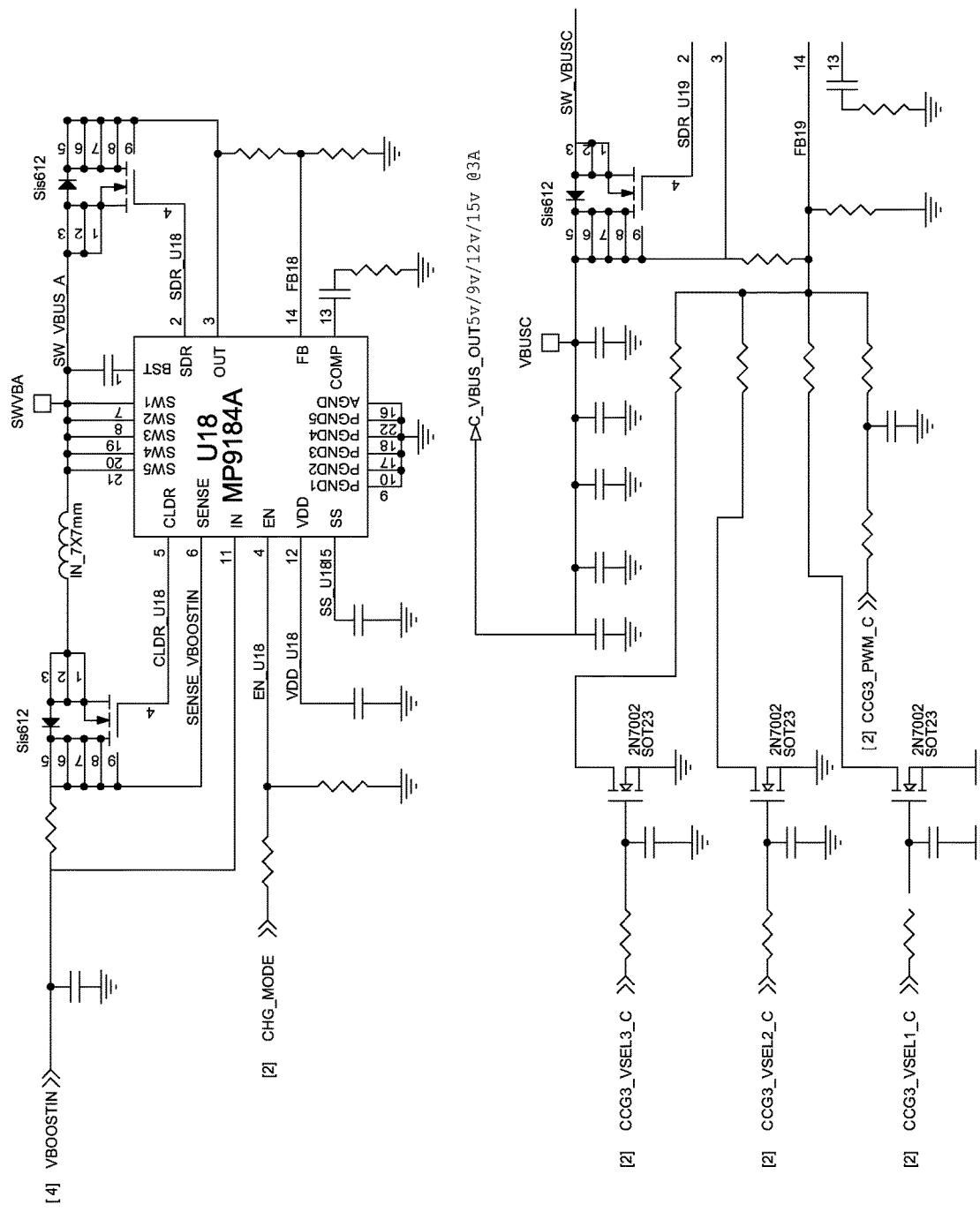
FIG. 6 is a first circuit structure reference diagram of a first portion of a power management module according to embodiments of the present disclosure.
Figure 7:
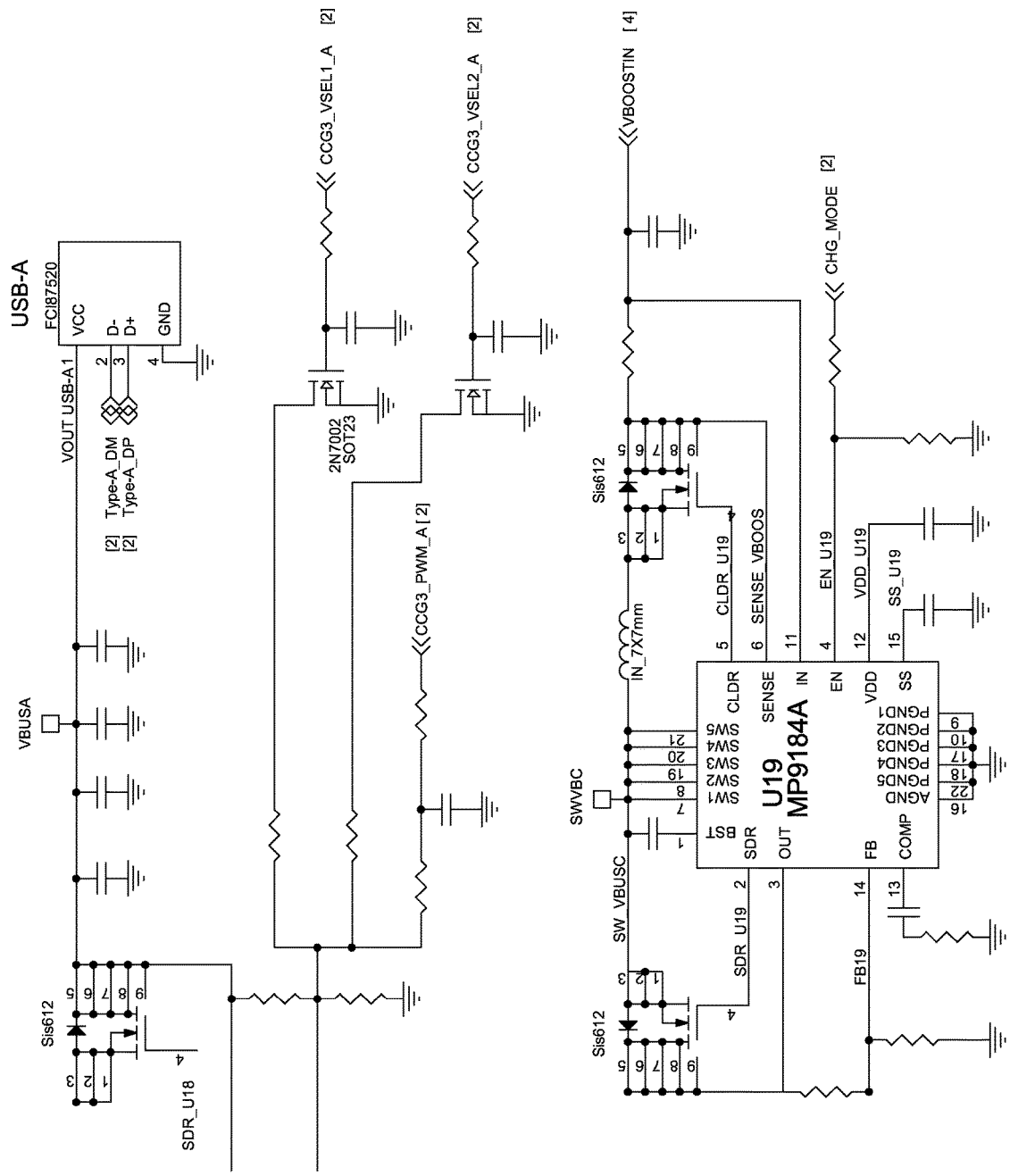
FIG. 7 is a second circuit structure reference diagram of a first portion of a power management module according to embodiments of the present disclosure.
Figure 8:
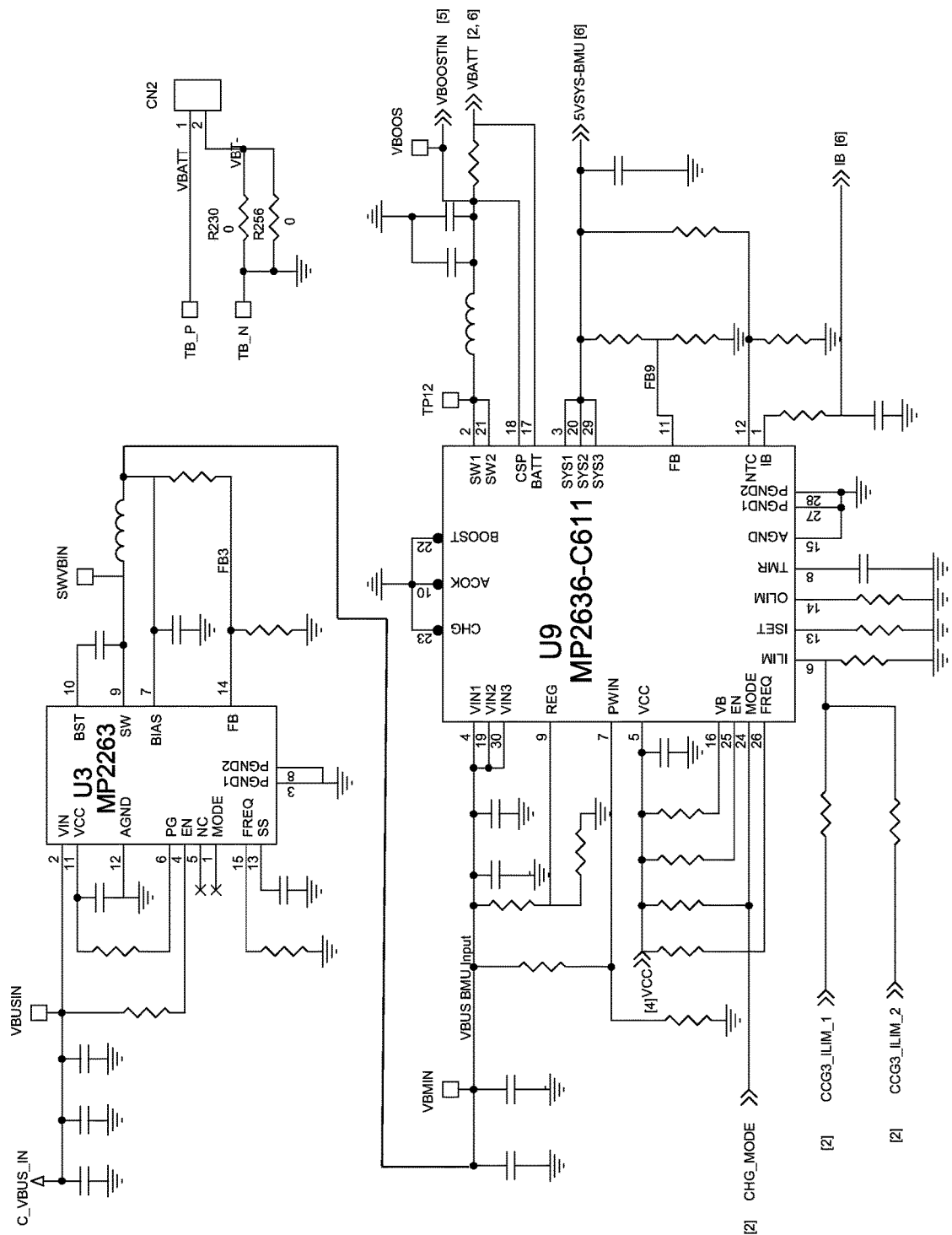
FIG. 8 is a circuit structure reference diagram of a second portion of a power management module according to embodiments of the present disclosure.
Figure 9:
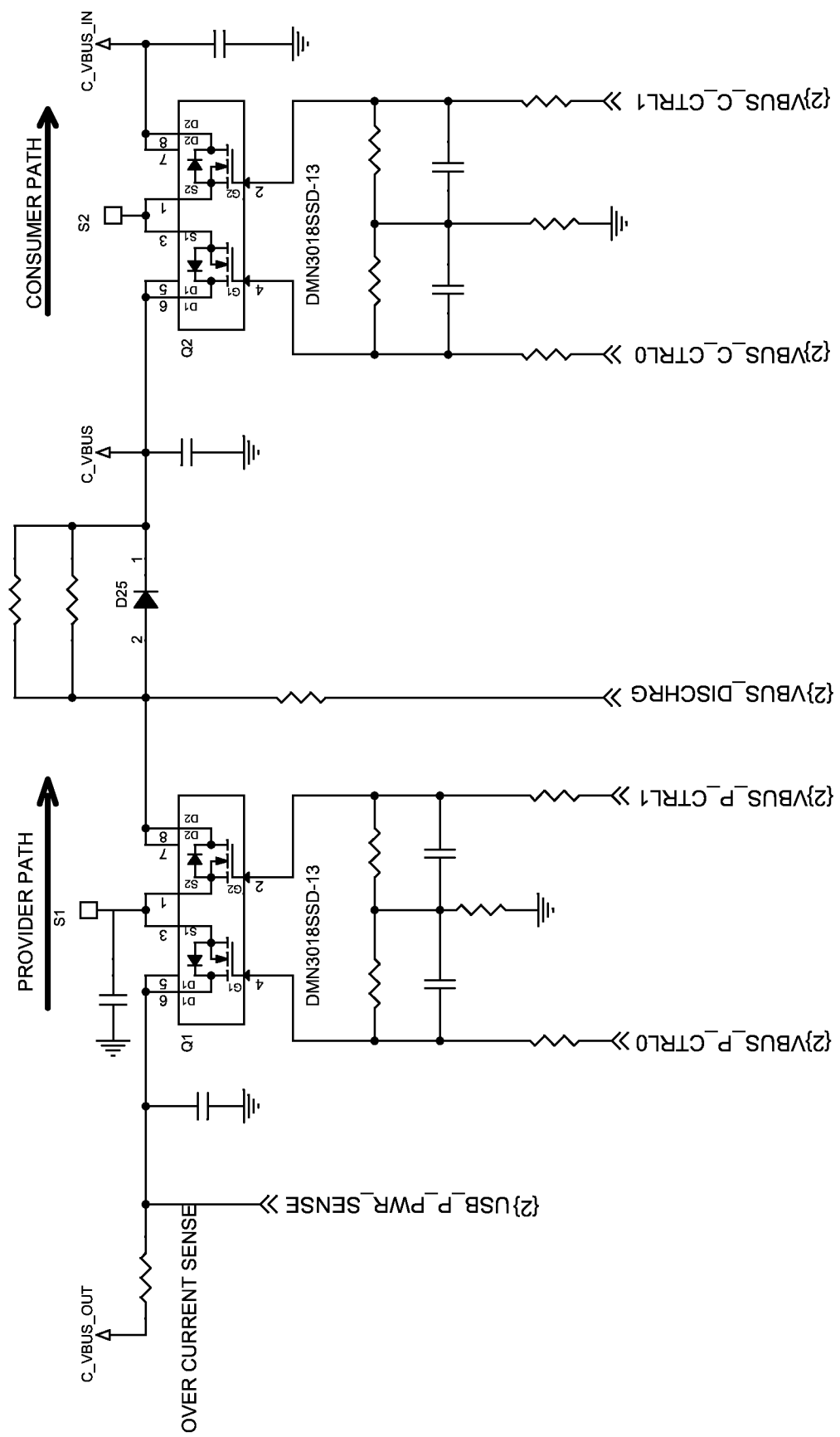
FIG. 9 is a circuit structure reference diagram of a third portion of a power management module according to embodiments of the present disclosure.
Figure 10:
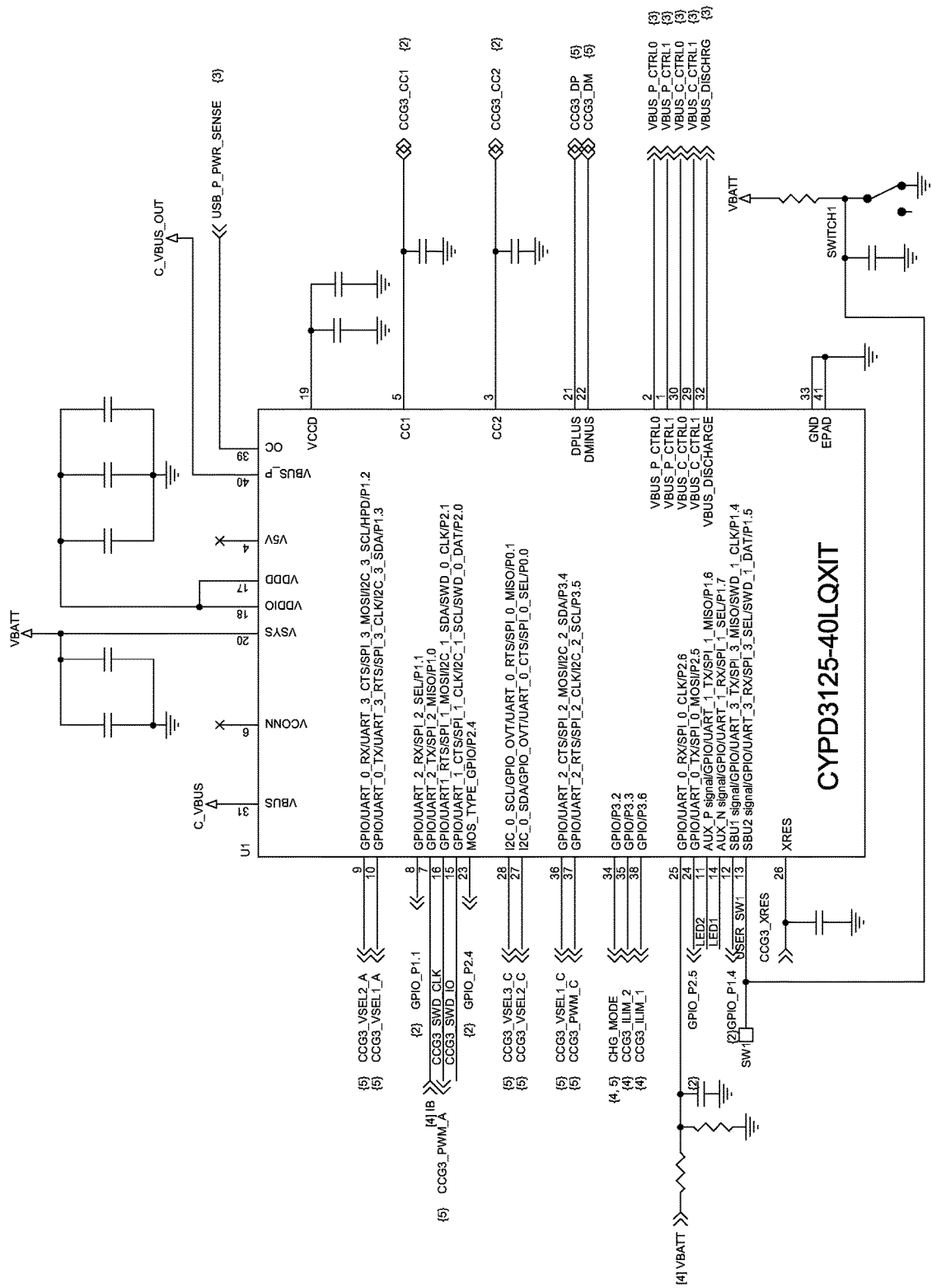
FIG. 10 is a first circuit structure reference diagram of a fourth portion of a power management module according to embodiments of the present disclosure.
Figure 11:
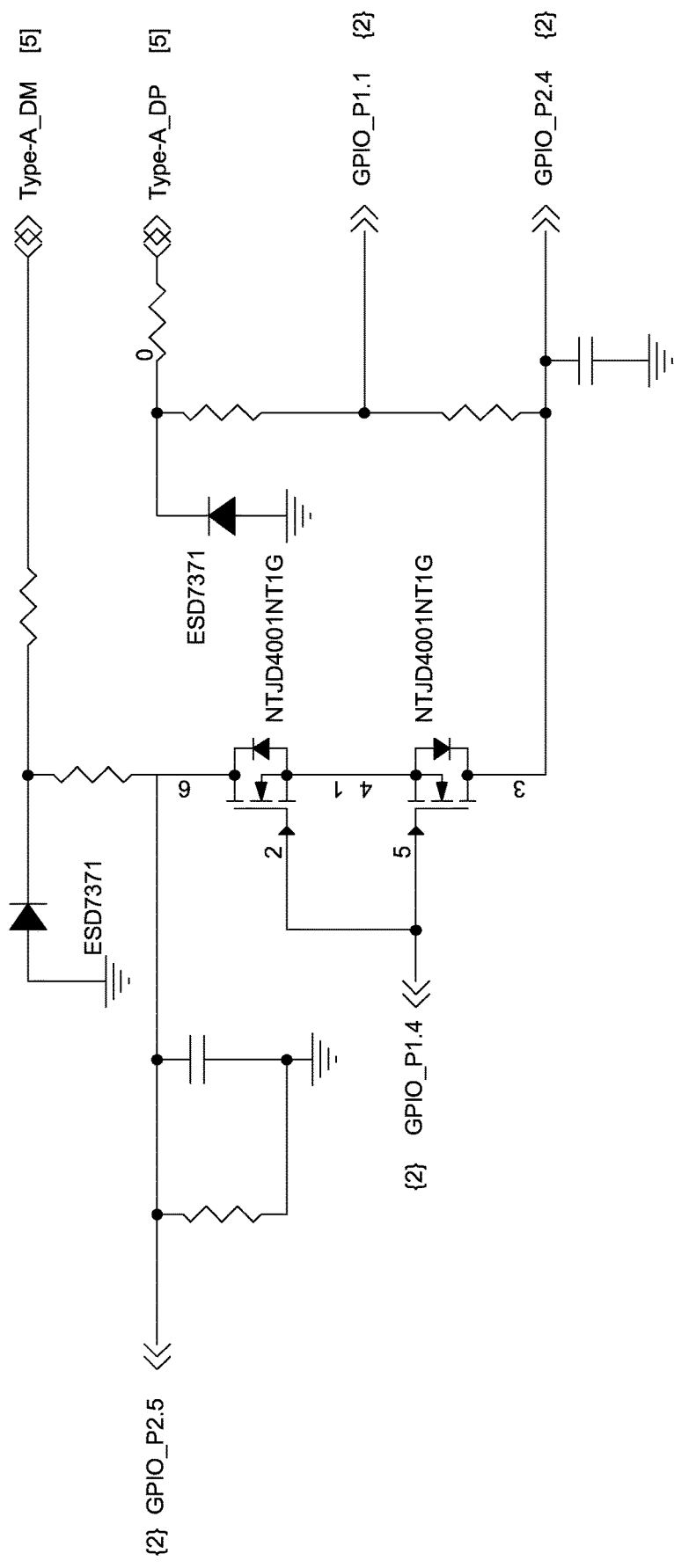
FIG. 11 is a second circuit structure reference diagram of a fourth portion of a power management module according to embodiments of the present disclosure.

In order to be capable of providing various options for the user to control the display screen, the wireless display screen of the embodiment further comprises a Bluetooth communication module k used for receiving a wireless control signal sent by the host device in order to adjust and control the display content of the liquid crystal display screen f through the touch capacitive screen g and simultaneously to feed back a response signal of the touch capacitive screen g to the host device, wherein the Bluetooth communication module k is connected between the power management module and the touch driving chip h in order to obtain the working power or the touch response signal. Therefore, an upstream and downstream control signal data transmission function between the whole display screen and the host device can be achieved through the Bluetooth communication module k, so that the user is convenient to perform the wireless signal matching and pairing connection between the whole display screen and the host device, the user can send a control instruction to a paired display screen through the host device, and the host device can implement an obtained feedback signal of the display screen; wherein the Bluetooth communication module k can adopt an NRF52810 type Bluetooth communication chip according to the actual situation, and its circuit structure can be specifically configured referring to FIG. 5.

In order to ensure the accuracy of a signal fed back by the display screen body to the host device and create conditions for performing the upstream and downstream control between the host device and the whole display screen, the wireless display screen of the embodiment further comprises an APP (application) software mapping module m used for uploading a coordinate signal of the touch capacitive screen to the host device through the Bluetooth communication module k, and the APP software mapping module m is connected between the Bluetooth communication module k and the touch capacitive screen g. The APP software mapping module m of the embodiment can adopt software program prestored in the touch driving chip h or the Bluetooth communication chip according to the actual situation, and can also adopt an entity electronic component with such function.

In order to help the user to adjust parameters (such as brightness, contrast ratio and the like) of a video image displayed by the display screen body, the audio/video signal conversion process module b of the embodiment is further connected with a physical key set n for adjusting and controlling display parameters of the display screen body through the audio/video signal conversion process module b. Therefore, the user does not need to adjust and control the video image on the host device and only needs to adjust and control the display screen directly on the scene; and certainly, when the loudspeaker e is configured, audio parameters (such as volume and the like) can be timely adjusted and controlled through function classification of the physical key set n.

In order to furthest enrich the types of the signal interfaces of the whole display screen to meet the use requirements of the numerous relatively more traditional host devices, the wireless display screen of the embodiment further comprises at least one DC/DC signal interface p for receiving the audio/video stream signal outputted by the host device through the data cable and transmitting the audio/video stream signal to the audio/video signal conversion process module b in an HDMI signal transmission format. Therefore, synchronous display can be performed through the display screen after discrimination and selection of the video signal received by the audio/video signal conversion process module b.

In order to ensure that the whole display screen can independently provide the power for each electric component and simultaneously create conditions for the whole display screen to charge the host device, the power management module of the embodiment comprises a lithium battery energy storage module q, a lithium battery management module r used for performing overcharge and overdischarge management on the lithium battery energy storage module q, a Type-C female socket s used for being physically connected with the host device, a charge/discharge management module t used for charging electric energy outputted through the Type-C female socket s to the lithium battery energy battery module q through the lithium battery management module r or externally discharging electric energy released by the lithium battery energy storage module q through the lithium battery management module r via the Type-C female socket s, and a power switch control module u used for receiving the electric energy outputted by the lithium battery management module r and at least providing the electric energy for the display screen body, the wireless audio/video signal receiving module a and the audio/video signal conversion process module b; wherein the Type-C female socket c, the charge/discharge management module t, the lithium battery management module r and the power switch control module u are sequentially connected, and the lithium battery energy storage module q is connected to the lithium battery management module r. Therefore, the lithium battery management module r can be used for performing overcharge and overdischarge management on the lithium battery energy storage module q, the charge/discharge management module t can be used for performing a charge or discharge instruction sent by the lithium battery energy storage module q in order to achieve a charging operation of the lithium battery energy storage module q or a discharging operation of a peripheral host device connected with the Type-C female socket s, and the power switch control module u can be taken as a power core manager of the whole display screen in order to provide the working power for each electric module which forms the display screen.

Additionally, in order to further optimize the system structure and the functions of the whole power management module, the power management module of the embodiment further comprises an upstream charge protocol management module v used for externally outputting the electric energy outputted through the lithium battery management module r by performing PD protocol communication on a charge interface (such as the above Type-C interface c built by the Type-C protocol process module d), and the upstream charge protocol management module v is connected between the lithium battery management module r and the power switch control module u. Therefore, it is further ensured that the whole power management module even the whole display screen has a function of externally outputting the electric energy in order to charge the host device, such as the mobile phone, the tablet computer and the like.

Wherein the whole power management module (including the charge/discharge management module t, the lithium battery management module r, the power switch control module u and the upstream charge protocol management module v) of the embodiment can be formed by building a combination of MP9184A type power management chip, MP2263 type power management chip, MP2636-C611 type mobile power chip, CYPD3125-40LQXIT type integrated control chip and the like according to the actual situation, and its specific circuit structure can be configured referring to FIG. 6, FIG. 7, FIG. 8, FIG. 9 and FIG. 10 and FIG. 11.

The foregoing is merely a favourable embodiment of the present disclosure and does not constitute a limitation on the scope of the present disclosure. Any equivalent structure or equivalent process change made by using the description and the accompanying drawings of the present disclosure, or direct or indirect application thereof in other related technical fields, shall still fall in the protection scope of the patent of the present disclosure.

What is claimed is:

1. A wireless display screen, comprising:
a display screen body for displaying a dynamic or static image/video based on a wireless audio/video signal;
a wireless audio/video signal receiving module for receiving a wireless audio/video signal emitted by a host device and performing a decoding process on the received wireless audio/video signal to be in a signal output format;
an audio/video signal conversion process module for converting a video signal outputted by the wireless audio/video signal receiving module into a display signal which is adaptable to be outputted at the display screen body to perform image display; and
a power management module used for providing working voltage for the display screen body, the wireless audio/video signal receiving module and the audio/video signal conversion process module, wherein the wireless audio/video signal receiving module is connected to the display screen body through the audio/video signal conversion process module, and the power management module is simultaneously connected to the display screen body, the wireless audio/video signal receiving module and the audio/video signal conversion process module, and
wherein the wireless display screen is capable of performing image synchronous display according to the received video signal without being dependent on configuration of communicating interface of the host device and without a need for a match between a communicating interface of the wireless display screen and a communicating interface of the host device; and
the power management module comprises a lithium battery energy storage module, a lithium battery management module used for performing overcharge and overdischarge management on the lithium battery energy storage module, a Type-C female socket used for being physically connected with the host device, a charge/discharge management module used for charging electric energy outputted through the Type-C female socket to the lithium battery energy battery module through the lithium battery management module or externally discharging electric energy released by the lithium battery energy storage module through the lithium battery management module via the Type-C female socket, and a power switch control module used for receiving the electric energy outputted by the lithium battery management module and at least providing the electric energy for the display screen body, the wireless audio/video signal receiving module and the audio/video signal conversion process module; and the Type-C female socket, the charge/discharge management module, the lithium battery management module and the power switch control module are sequentially connected, and the lithium battery energy storage module is connected to the lithium battery management module.

2. The wireless display screen according to claim 1, further comprising a Type-C interface simultaneously connected with the audio/video signal conversion process module and the power management module in order to receive an audio/video stream signal outputted by the host device through a data cable and transmit the audio/video stream signal to the audio/video signal conversion process module in a Display Port (DP) signal transmission format, and a Type-C protocol process module connected between the power management module and the Type-C interface in order that the Type-C interface performs electric energy transmission on the host device by performing Power Delivery (PD) protocol communication on the power management module.

3. The wireless display screen according to claim 1, further comprising a loudspeaker connected with the audio/video signal conversion process module in order to receive an audio signal outputted by the audio/video signal conversion process module.

4. The wireless display screen according to claim 1, wherein the display screen body comprises a liquid crystal display screen used for receiving the video signal outputted by the audio/video signal conversion process module, a touch capacitive screen integrated with the liquid crystal display screen into a whole body in order to adjust and control a display content of the liquid crystal display screen by receiving an external touch instruction signal and a touch driving chip connected with the touch capacitive screen in order to drive the touch capacitive screen to perform a touch instruction; and the power management module is simultaneously electrically connected to the liquid crystal display screen, the touch capacitive screen and the touch driving chip.

5. The wireless display screen according to claim 4, further comprising a Bluetooth communication module used for receiving a wireless control signal sent by the host device in order to adjust and control the display content of the liquid crystal display screen through the touch capacitive screen and simultaneously to feed back a response signal of the touch capacitive screen to the host device, wherein the Bluetooth communication module is connected between the power management module and the touch driving chip.

6. The wireless display screen according to claim 5, further comprising an application (APP) software mapping module used for uploading a coordinate signal of the touch capacitive screen to the host device through the Bluetooth communication module, wherein the APP software mapping module is connected between the Bluetooth communication module and the touch capacitive screen.

7. The wireless display screen according to claim 1, wherein the audio/video signal conversion process module is further connected with a physical key set for adjusting and controlling display parameters of the display screen body through the audio/video signal conversion process module.

8. The wireless display screen according to claim 1, further comprising at least one DC/DC signal interface for receiving the audio/video stream signal outputted by the host device through the data cable and transmitting the audio/video stream signal to the audio/video signal conversion process module in an HDMI signal transmission format.

9. The wireless display screen according to claim 1, wherein the power management module further comprises an upstream charge protocol management module used for externally outputting the electric energy outputted through the lithium battery management module by performing PD protocol communication on a charge interface, and the upstream charge protocol management module is connected between the lithium battery management module and the power switch control module.

* * * * *